April 29, 1930.　　　C. F. HESS　　　1,756,825
AUTOMOBILE SEAT CONSTRUCTION
Filed Sept. 8, 1927　　　2 Sheets-Sheet 1
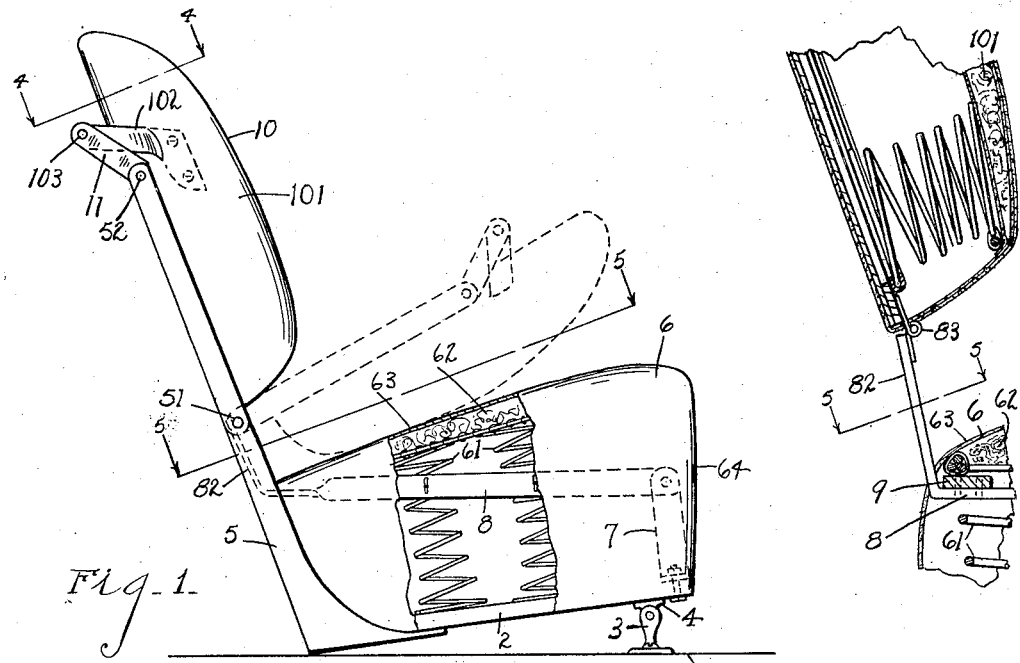
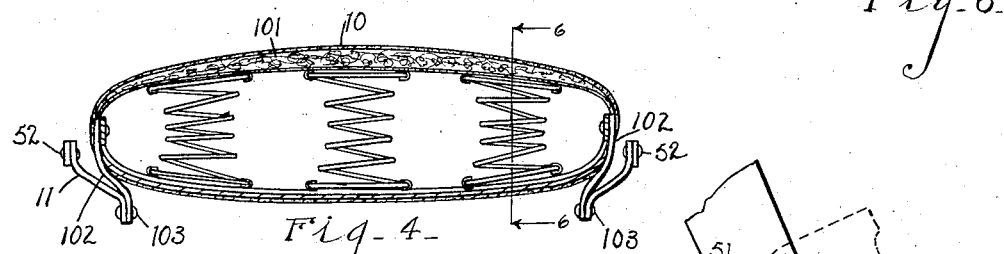
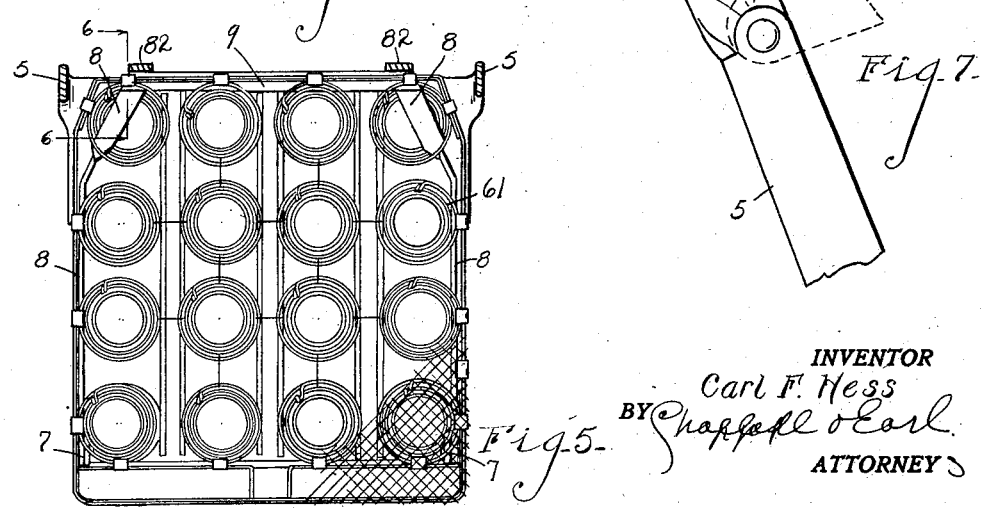
INVENTOR
Carl F. Hess
BY Chappell & Earl
ATTORNEYS April 29, 1930.  C. F. HESS  1,756,825
AUTOMOBILE SEAT CONSTRUCTION
Filed Sept. 8, 1927   2 Sheets-Sheet 2
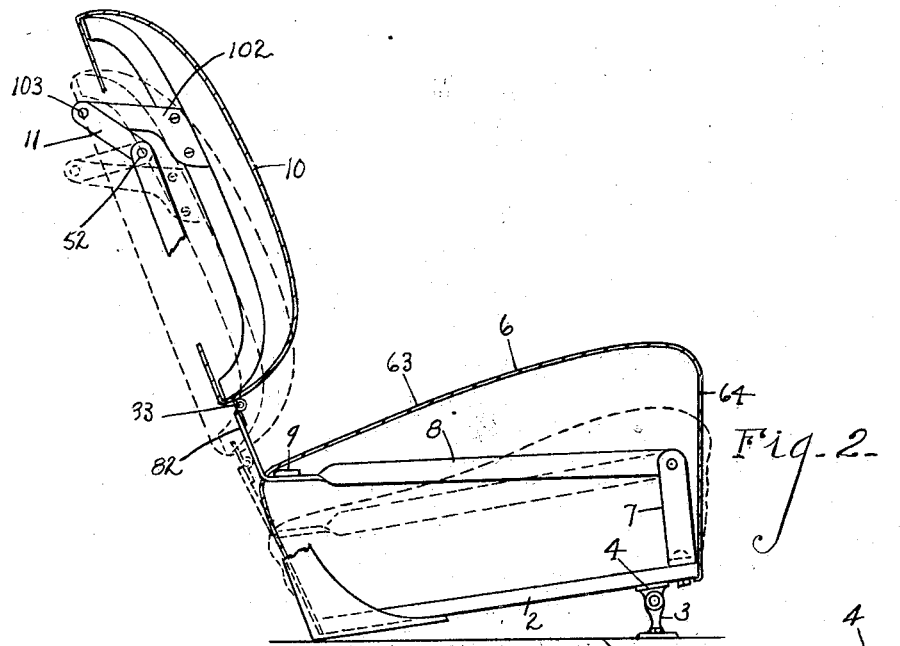
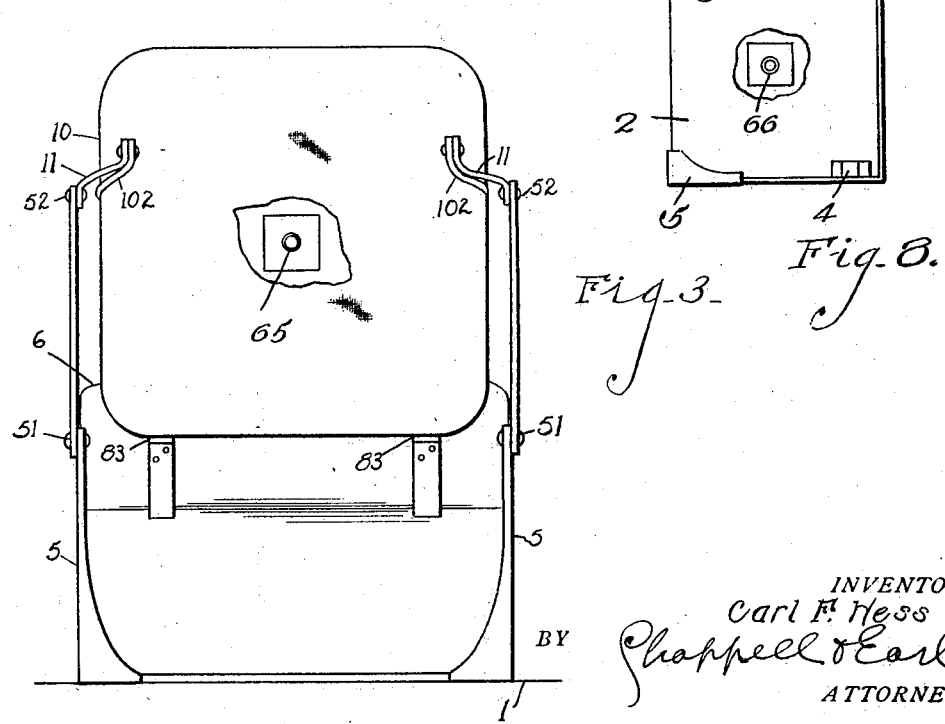
INVENTOR
Carl F. Hess
BY Chappell & Earl
ATTORNEYS Patented Apr. 29, 1930

1,756,825

UNITED STATES PATENT OFFICE

CARL F. HESS, OF COMSTOCK PARK, MICHIGAN

AUTOMOBILE SEAT CONSTRUCTION

Application filed September 8, 1927. Serial No. 218,224.

This invention is an improvement and development of the structure of my United States Patent No. 1,523,591, issued January 20, 1925. The objects of this invention are, First, to provide an improved combination seat and back structure in which the back will cooperate with the depression of the seat cushion and move therewith.

Second, to provide such a structure which is foldable or collapsible.

Third, to provide such a structure with pivotal support connection as distinguished from sliding parts.

Fourth, to provide such structure which is compact, of light weight, and very strong and economical to build.

Objects pertaining to details of construction and operation will appear from the detailed description to follow. The invention is defined in the claims. A structure which is a preferred embodiment of my invention is illustrated in the accompanying drawing, in which:

Fig. 1 is a detail side elevation view of my improved seat, portions of the seat covering being broken away to show details, parts being shown in dotted lines, and the collapsed position of the back being also indicated by dotted lines.

Fig. 2 is a side elevation sketch, with the cushions in section and the springs omitted, the action when the seat is compressed being shown by dotted lines.

Fig. 3 is a rear elevation outline sketch.

Fig. 4 is an enlarged detail transverse sectional view on line 4—4 of Fig. 1, showing the relation of the back cushioning and upholstering and the pivoted supporting arm and means for the back.

Fig. 5 is a detail sectional view on line 5—5 of Figs. 1 and 6, with the upholstery covering removed, showing the relation of the springs to the oblique seat support and details of the structure.

Fig. 6 is an enlarged detail sectional view showing the pivotal or hinge connection between the oblique support and the lower edge of the seat back, taken on line 6—6 of Figs. 4 and 5.

Fig. 7 is an enlarged detail view of the rear joint structure 51 in the back support 5, the folded position being indicated by dotted lines.

Fig. 8 is a detail of the valve 66 in the seat bottom.

The parts of the drawings will be identified by numerals of reference which are the same in all the views.

1 is the floor of an automobile. 2 is the bottom board of the seat. 3 is a hinge bracket secured to the floor 1. 4 is the hinge member on the under side of the front part of the bottom 2, whereby the entire seat is hinged to swing forward. This of course is usual construction and may be omitted and the seat fixed directly on the floor 1. 5 are the back supporting columns, one at each rear corner of the seat, which are provided with rule joints 51 at the proper elevation for folding the back of the seat forward to horizontal position above the seat.

6 is the seat cushion made up of springs 61 and a suitable padding 62. The seat covering 63 is provided with flexible side walls 64. The structure is valved the same as the structure of my former patent. Valve 65 is in the back (see Fig. 3) and valve 66 is in the bottom (see Fig. 8). Within the seat cushion at each front corner is an upright 7 bolted or otherwise secured to the seat bottom. Oblique members 8 are pivoted to the upper ends of the posts and extend out through the rear upper corner of the seat cushion and are secured to rigid cross bars 9 at the rear edge of the seat by suitable riveting or other means. The oblique members 8 are extended upwardly at 82 to form back supports, the same being hinged to a cross bar 83 at the bottom of the back.

The back 10 is of rounded contour and provided with an upholstered spring cushion 101. Arms 102 extend rearwardly and upwardly at each side of the back and are connected by a pair of links 11 which are obliquely disposed and pivoted at 52 at the top of the back support 5 and at 103 to the rear ends of the arms 102.

It will be seen from this description that the back 10 is free to move up and down when the seat cushion is depressed, owing to the swinging action of the pair of links 11. This action very distinctly appears in Fig. 2. At the same time the lower edge of the back, being hinged to the upward extensions 82 of the oblique members 8, moves up and down, freely shifting back and forth from the vertical position slightly but to an immaterial and negligible extent when the depth of the seat cushion is taken into consideration.

The structure will be effective in operation if the back support 5 is not provided with the rule joint 51, but when that is located in correct relation to the pivotal connection of the extensions of the oblique bars 8 the seat is readily foldable and collapsible, which is of distinct advantage in such a structure.

I desire to claim the invention in the specific form in which it is illustrated, and also broadly, as pointed out in the appended claims.

Having thus described my invention, what I claim as new and desire to secure by Letters Patent is:

1. In an automobile seat structure, the combination of a seat bottom pivoted to the floor of an automobile, deep spring cushion with flexible sides valved to retard its action, upright posts at each front corner within the cushion casing, oblique members pivoted to the upper end thereof and extending rearwardly to the upper rear edge of said cushion and extending outwardly into hinge members at each side, a rigid cross bar at the back and top of said seat cushion connecting the rear portions of said oblique members, an independent seat back adapted to move up and down connected to said hinge members at the rear of said oblique members, back supporting columns containing rule joints opposite the hinge at the lower part of said back, rearwardly projecting arms at the upper portion of said back, obliquely-disposed forwardly-extending links connecting the rear ends of said arms to the upper ends of said back support, substantially as described for the purpose specified.

2. In an automobile seat structure, the combination of a seat bottom, deep spring cushion with flexible sides valved to retard its action, upright posts at each front corner within the cushion casing, oblique members pivoted to the upper end thereof and extending rearwardly to the upper rear edge of said cushion and extending outwardly into hinge members at each side, a rigid cross bar at the back and top of said seat cushion connecting the rear portions of said oblique members, an independent seat back adapted to move up and down connected to said hinge members at the rear of said oblique members, back supporting columns containing rule joints opposite the hinge at the lower part of said back, rearwardly projecting arms at the upper portion of said back, and obliquely-disposed forwardly-extending links connecting the rear ends of said arms to the upper ends of said back support, substantially as described for the purpose specified.

3. In an automobile seat structure, the combination of a seat bottom, deep spring cushion with flexible sides, upright posts at each front corner within the cushion casing, oblique members pivoted to the upper end thereof and extending outwardly into hinge members at each side, a rigid cross bar at the back and top of said seat cushion connecting the rear portions of said oblique members, an independent seat back adapted to move up and down connected to said hinge members at the rear of said oblique members, back supporting columns containing rule joints opposite the hinge at the lower part of said back, rearwardly projecting arms at the upper portion of said back, and obliquely-disposed forwardly-extending links connecting the rear ends of said arms to the upper ends of said back support, substantially as described for the purpose specified.

4. In an automobile seat structure, the combination of a seat bottom pivoted to the floor of an automobile, deep spring cushion with flexible sides, upright posts at each front corner within the cushion casing, oblique members pivoted to the upper end thereof and extending rearwardly to the upper rear edge of said cushion and extending outwardly into hinge members at each side, a rigid cross bar at the back and top of said seat cushion connecting the rear portions of said oblique members, an independent seat back adapted to move up and down connected to said hinge members at the rear of said oblique members, back supporting columns containing rule joints opposite the hinge at the lower part of said back, rearwardly projecting arms at the upper portion of said back, and obliquely-disposed forwardly-extending links connecting the rear ends of said arms to the upper ends of said back support, substantially as described for the purpose specified.

5. In an automobile seat structure, the combination of a seat bottom, deep spring cushion with flexible sides, upright posts at each front corner within the cushion casing, oblique members pivoted to the upper end thereof and extending outwardly into hinge members at each side, an independent seat back adapted to move up and down connected to said hinge members at the rear of said oblique members, back supporting columns containing rule joints opposite the hinge at the lower part of said back, rearwardly projecting arms at the upper portion of said back, and obliquely-disposed forwardly-extending links connecting the rear ends of said arms to the upper ends of said back support, substantially as described for the purpose specified.

6. In an automobile seat structure, the combination of a seat bottom, deep spring cushion with flexible sides, upright posts at each front corner within the cushion casing, oblique members pivoted to the upper end thereof and extending outwardly into hinge members at each side, an independent seat back adapted to move up and down connected to said hinge members at the rear of said oblique members, back supporting columns, rearwardly projecting arms at the upper portion of said back, and obliquely-disposed forwardly-extending links connecting the rear ends of said arms to the upper ends of said back support, substantially as described for the purpose specified.

7. In an automobile seat structure, the combination of a seat bottom, deep spring cushion with flexible sides, upright posts at each front corner within the cushion casing, oblique members pivoted to the upper end thereof and extending outwardly into hinge members at each side, a rigid cross bar at the back and top of said seat cushion connecting the rear portions of said oblique members, an independent seat back adapted to move up and down connected to said hinge members at the rear of said oblique members, back supporting columns, rearwardly-projecting arms at the upper portion of said back, and obliquely-disposed forwardly-extending links connecting the rear ends of said arms to the upper ends of said back support, substantially as described for the purpose specified.

8. In an automobile seat structure, the combination of a seat bottom, deep spring cushion with flexible sides, upright posts at each front corner within the cushion casing, oblique members pivoted to the upper end thereof and extending outwardly into hinge members at each side, a rigid cross bar at the back and top of said seat cushion connecting the rear portions of said oblique members, an independent seat back adapted to move up and down connected to said hinge members at the rear of said oblique members, and back supporting columns containing rule joints opposite the hinge at the lower part of said back, coacting as specified.

9. In an automobile seat structure, the combination of a seat bottom, deep spring cushion with flexible sides, upright posts at each front corner within the cushion casing, oblique members pivoted to the upper end thereof and extending outwardly into hinge members at each side, an independent seat back adapted to move up and down connected to said hinge members at the rear of said oblique members, and back supporting columns containing rule joints opposite the hinge at the lower part of said back, coacting as specified.

In witness whereof I have hereunto set my hand.

CARL F. HESS.